Feb. 5, 1946. R. MATSON 2,394,317
FILM SPLICING DEVICE
Filed May 1, 1942 2 Sheets-Sheet 2
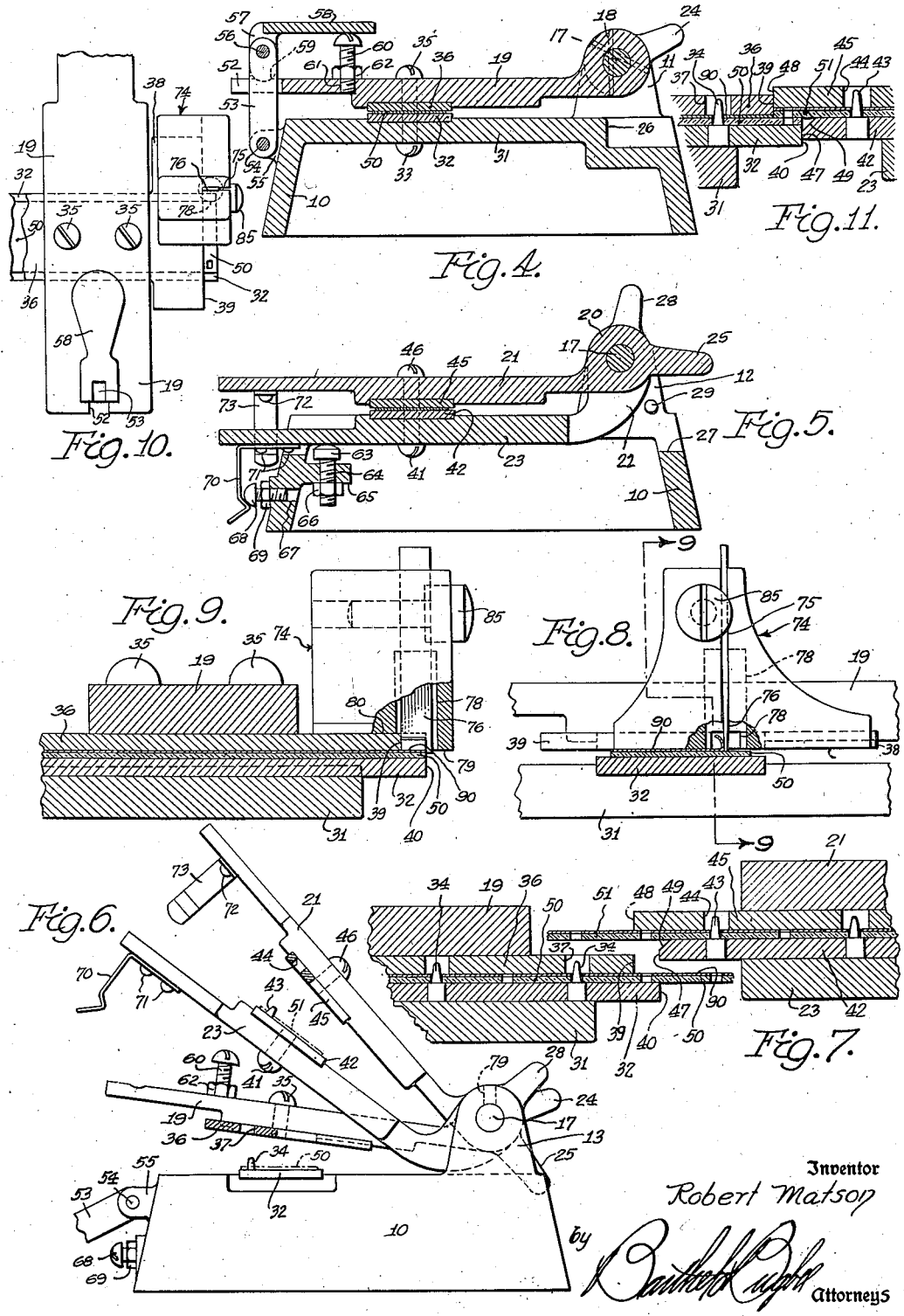
Inventor
Robert Matson
by
Attorneys Patented Feb. 5, 1946

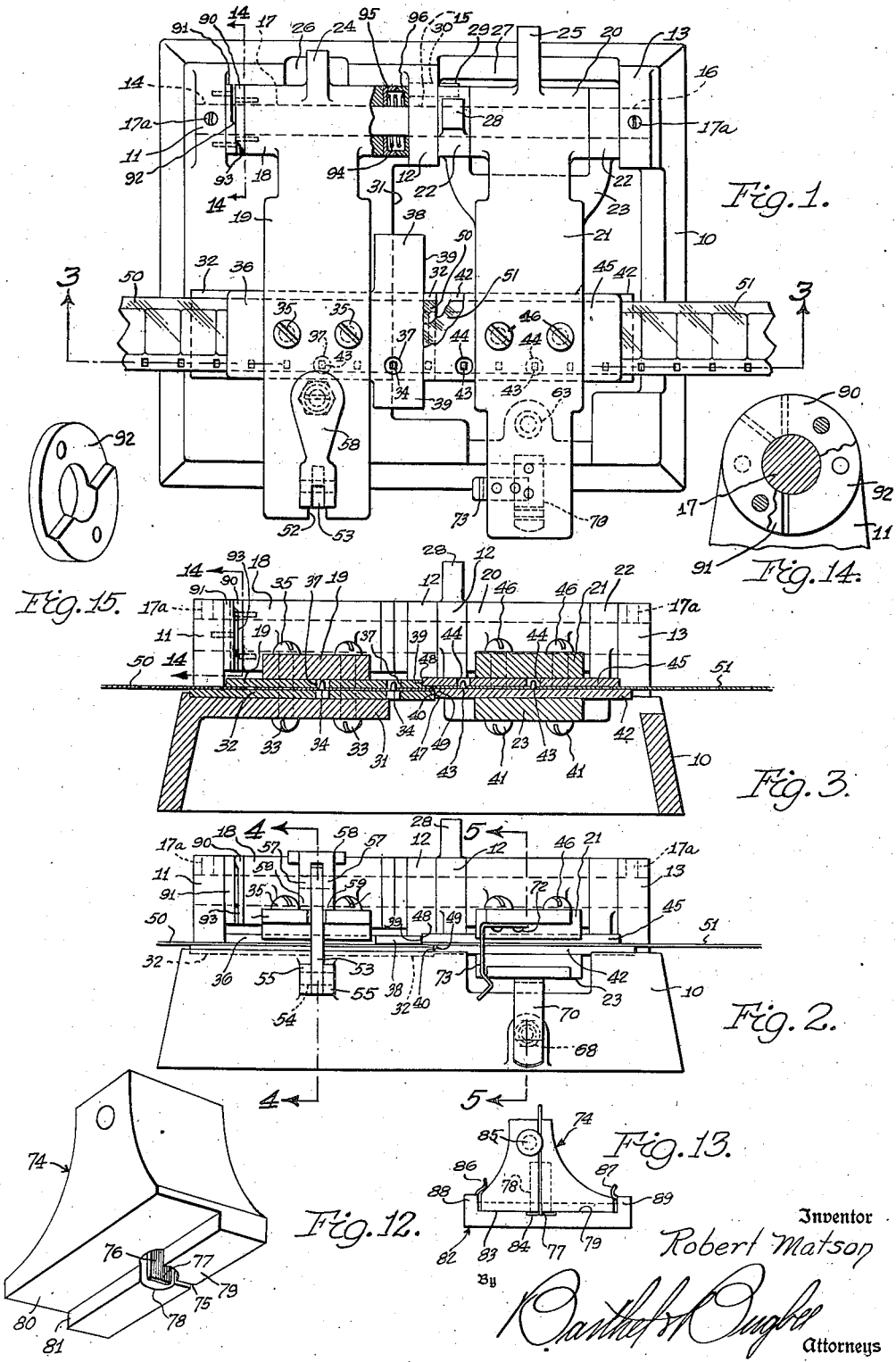

2,394,317

UNITED STATES PATENT OFFICE

2,394,317
FILM SPLICING DEVICE

Robert Matson, Detroit, Mich., assignor, by mesne assignments, to Motion Picture Engineering Corporation, a corporation of Illinois Application May 1, 1942, Serial No. 441,317

15 Claims. (Cl. 154—42)

This invention relates to film splicers and particularly to such devices where the film ends are severed and spliced without moving them longitudinally from their positions.

One object of this invention is to provide a film splicer having one of the film ends mounted between a pair of swinging clamp arms having cutters thereon cooperating with cutters mounted adjacent a stationary film end, one of these cutters having an extended edge which serves as a guide for a scraper for scraping the emulsion from the film end.

Another object is to provide a film splicer having one film end clamped between stationary cutters which also serve as clamps, the other film end being clamped by the cutters mounted on a pair of swinging arms, these swinging arms being interconnected by a detent, one of the swinging arms also having a releasable detent engaging the base of the splicer so that if the upper swinging arm is lifted, the lower arm remains yieldingly held against the base, whereas if the lower swinging arm is lifted, it releases itself from the base and also lifts the upper swinging arm.

Another object is to provide a film splicer having combined clamps and cutters for shearing the film ends in spaced overlapping relationship, one of the cutters having a beveled edge so that excess cement running off the film during the splicing operation may be received by the groove formed between this beveled edge and the edge of the opposing cutter.

Another object is to provide a film splicer having one film end clamped between a stationary clamping cutter which is engaged by a swinging clamping cutter held thereagainst by a clamping cam, the opposite film end being held by the clamping cutters mounted on swinging arms, the two pairs of cutters being mounted in stepped positions so that they substantially simultaneously sever the film ends in slightly overlapping relationship.

Another object is to provide a film splicer having clamping cutters for holding the film ends, the edge of one of the cutters being elongated to serve as a guide for a scraper.

Another object is to provide a scraper for use with the film splicer as set forth in the preceding object, together with a holder jig for simplifying the setting of the edge of the scraper relatively to the scraper itself.

Another object is to provide means for shifting one of the pair of clamp arms axially so as to prevent the jamming of the film end clamped upon an adjacent clamp arm as the latter is being raised.

In the drawings:

Figure 1 is a top plan view of a preferred embodiment of the film splicer according to the present invention.

Figure 2 is a front elevation of the film splicer shown in Figure 1.

Figure 3 is a vertical section along the line 3—3 in Figure 1, showing the film ends after cutting in overlapping relationship ready for splicing.

Figure 4 is a vertical cross-section along the line 4—4 in Figure 2.

Figure 5 is a vertical cross-section taken along the line 5—5 in Figure 2, through the swinging clamp arms.

Figure 6 is a side elevation of the film splicer shown in Figures 1 and 2, with the three clamp arms raised through different amounts to disclose their relationship more clearly.

Figure 7 is an enlarged section taken substantially along the line 3—3 in Figure 1 showing the relationship of the clamping cutters just before the film ends are severed.

Figure 8 is a side elevation, partly in section, looking toward the right-hand end of Figure 10, showing the scraper in operation.

Figure 9 is a section along the line 9—9 in Figure 8.

Figure 10 is a top plan view of a part of the left-hand side of Figure 1 showing the scraper at the start of its scraping stroke.

Figure 11 is an enlarged longitudinal vertical section similar to Figure 7 but showing the overlapping film ends after they have been severed and the emulsion has been scraped away at their junction.

Figure 12 is a bottom perspective view of a scraper used in removing the emulsion from the film.

Figure 13 is a side elevation of the scraper of Figure 12, shown in its holding and blade adjusting jig.

Figure 14 is an enlarged fragmentary section partly broken away and taken along the line 14—14 in Figure 1.

Figure 15 is a perspective view of one of the cams shown in Figure 14 for axially shifting one of the clamp arms.

General arrangement

In general, the film splicer of this invention consists of two pairs of clamping cutters arranged in stepped positions so that the film ends are severed in overlapping relationship. The clamping cutters of one pair are stationary during operation, the film ends being severed by the motion of the other pair of clamping cutters past the first pair.

One clamping cutter of the stationary pair is mounted upon the base of the instrument, the cooperating clamping cutter being mounted on a swinging arm which is clamped against the base by a cam device, and shifted axially by another cam device.

One of the film ends is held between this stationary pair of clamping cutters, whereas the other end is held between the movable pair, each of which is mounted on an independent swinging arm. Thus there are three swinging arms, each carrying a clamping cutter, the fourth clamping cutter being mounted on the base. Each clamping cutter consists of a bar of steel or other suitable material having a cutting edge. Each pair of clamping cutters thus serves not only for severing the film ends but also for clamping one of the film ends therebetween.

The edge of one of the cutters immediately beneath the film is beveled so that it may provide space to receive any excess cement which may run out from between the spliced joint during the splicing operation. The tight engagement of the clamping cutters with one another prevents the flow of the cement backward along the film.

The movable pair of clamping arms are interconnected by a releasable spring detent and one of these arms is provided with an additional spring detent releasably holding it in engagement with the base of the instrument. The upper clamping cutter of one pair is provided with an extending edge which also serves as a guide for the reciprocating motion of the scraper used to remove the emulsion from the film end. The scraper is provided with a blade engaging a recess in a holder jig in such a manner that the bottom of the recess is spaced downwardly below the scraper supporting surface by a distance equal to the approximate thickness of the emulsion on the film. In this way, the scraper blade can be simply and rapidly adjusted for cutting an exact and predetermined thickness of emulsion.

Construction

Referring to the drawings in detail, Figure 1 shows a preferred embodiment of the film splicer of this invention as consisting of a hollow base 10 having spaced upstanding ears 11, 12 and 13 with aligned bores 14, 15 and 16 therethrough. Mounted in these aligned bores is a shaft 17. The shaft 17 is held in position and against rotation by the set screws 17a.

Pivotally mounted on the left-hand end of the shaft 17 between the ears 11 and 12 is the hub 18 of a clamp arm 19, and mounted on the right-hand end thereof is the hub 20 of the upper clamp arm 21. Also mounted on the left-hand end of the shaft 17 is the yoke-like hub 22 of the lower clamp arm 23. The clamp arm hubs 18 and 20 are provided with integral projections 24 and 25 (Figure 1) cooperating with stop projections 26 and 27 on the base 10 for limiting the upward swinging of the clamp arms 19 and 21. Similarly the yoke-like hub 22 of the lower clamp arm 23 is provided with an integral projection 28 engaging a stop 29 (Figures 1 and 5) inserted in a horizontal aperture 30 in the base 10.

The base 10 is provided with a table portion 31 to which a lower stationary clamping cutter 32 is secured, as by the screws 33, and carrying spaced film aligning pins 34 (Figure 3). Secured to the upper left-hand clamp arm 19, as by the screws 35, is an upper clamping cutter 36 having recesses 37 aligned with the pins 34 for receiving the latter. The clamping cutter 36 is provided with a transversely extended portion 38 having a cutting edge 39 stepped backward longitudinally away from the cutting edge 40 of the lower clamping cutter 32.

Secured to the lower right-hand clamp arm 23, as by the screws 41 (Figure 3), is the lower right-hand clamping cutter 42, and provided with spaced film aligning pins 43. The latter cooperate with aligned apertures 44 in the upper right-hand clamping cutter 45 which is secured by the screws 46 to the upper right-hand clamping arm 21.

The right-hand clamping cutters 42 and 45 are provided with cutting edges 47 and 48 arranged in stepped relationship and co-acting respectively with the cutting edges 40 and 39 on the left-hand clamping cutters 32 and 36. The upper portion of the cutting edge 47 is beveled as at 49 so that it provides a trough for receiving excess cement which runs out from the overlapped film ends 50 and 51 while they are being spliced. The stepped arrangement of the cutting edges 39 and 48 relatively to the cutting edges 40 and 47 serves to cut the film ends 50 and 51 in overlapping relationship (Figures 7 and 11).

The left-hand swinging clamp arm 19 at its free end is provided with a slot 52 (Figures 1 and 4) adapted to receive a swinging link 53 pivoted as at 54 to the ears 55 extending outward from the base 10 (Figure 2). Pivoted as at 56 to the upper end of the swinging link 53 are the spaced yoke portions 57 at the end of the handle 58. The yoke portions 57 at their lower ends are provided with cam portions 59 which engage the upper surface of the clamp arm 19 adjacent the slot 52 and urge it downward when the handle 58 is pressed downward against the top of a stop screw 60 (Figure 4) inserted in the threaded aperture 61 in the clamp arm 19 and held in position by a lock nut 62. This mechanism serves to press and hold the film end 50 tightly between the upper and lower left-hand clamping cutters 36 and 32 respectively.

The lower right-hand clamping arm 23 near its outer end rests upon the top of a top screw 63 (Figure 5) threaded into a threaded aperture 64 in an inwardly projecting shelf 65 within the hollow base 10 and secured against rotation by the lock nut 66. Threaded into the threaded aperture 67 in the hollow base 10 (Figure 5) is a detent screw 68 locked in position by the lock nut 69 and serving to engage the bent end of the spring detent 70, the opposite end of which is secured as at 71 to the underside of the lower right-hand swinging clamp arm 23. Similarly secured as at 72 to the underside of the outer end of the upper right-hand clamp arm 21 (Figure 2) is an upper spring detent 73, the bent end of which engages the edge of the outer end of the lower right-hand clamp arm 23. In this manner the lower right-hand clamp arm 23 is releasably secured to the base 10 whereas the upper right-hand clamp arm 21 is releasably secured to the lower right-hand clamp arm 23. Thus when the lower right-hand clamp arm 23 is raised from the base 10 by lifting it at its free end, the upper and lower clamp arms 21 and 23 move upward as a unit and are held in engagement with one another and with the right-hand film end 51 by the spring detent 73.

The emulsion upon the left-hand film end 51, which faces upward, is removed by means of a scraper 74 (Figures 8, 9 and 12) having a vertical slot 75 accommodating a cutting blade 76, the cutting edge 77 of which projects an aperture 78 below the bottom surface 79. The bottom surface 79 is stepped below the bottom guide surface 80 by the height of the shoulder 81, which is substantially the thickness of the upper left-hand clamping cutter 36 along its transverse extension 38.

The cutting edge 77 is adjusted to project about 0.001 inch by letting it drop into a recess 84 in the surface 83 of a holder jig 82 having spring-holding clips 86 and 87 on its opposite ends 88 and 89 (Figure 13). The blade 76 is then clamped in its adjusted position by tightening the set screw 85.

To prevent the jamming of the film ends as the clamp arms 19, 21 and 23 are moved past each other when the clamp arm 19 is in a raised position beyond the elevated position of the arms 21 and 23, a pair of cams 90 and 91 are provided to shift the clamp arm 19 axially as it is raised. These cams have depressed sectors 92 and 93 for this purpose (Figures 14 and 15). A coil spring 94 between a pair of cupped washers 95 and 96 urges the cams 90 and 91 (Figure 1) into engagement.

*Operation*

In the operation of the film splicer of the invention, the clamp arms 19, 21 and 23 are raised and separated as shown in Figure 6. The left-hand film end 50 is then placed upon the lower left-hand clamping cutter 32 with its perforations upon the aligning pins 34. The clamping arm 19 is then swung downward, bringing the upper clamping cutter 36 against the upper surface of the film end 50. The operator then clasps the handle 58, swings the link 53 into the slot 52, and presses the handle 58 downward, tightly clamping the film end 50 between the upper and lower left-hand clamping cutters 36 and 32.

The right-hand film end is then placed upon the right-hand lower clamping cutter 42 with its perforations upon the aligning pins 43, and the upper right-hand clamping cutter 45 on the arm 21 swung down into engagement with the film, the spring detent 73 snapping into position as the upper and lower right-hand clamp arms 21 and 23 are brought together.

These are then swung downward through the position of Figure 7 into the position of Figure 11. As the members go through these positions, the upper cutting edge 48 coacts with the upper cutting edge 39 to cut off the right-hand film end 51 at substantially the same time the lower cutting edge 47 coacts with the lower cutting edge 40 to cut off the left-hand film end 50. The film ends 50 and 51 are thus severed in overlapping relationship, as shown in Figure 11, the overlap being sufficient for the making of a suitable splice.

The scraper 74 is now superimposed upon the transverse extension 38 of the upper left-hand clamping cutter 36 (Figure 10) with its surface 80 resting thereon and its blade 76 extending downward beyond the cutting edge 39 into engagement with the emulsion layer 90 upon the left-hand film end 50. The scraper 74 is then moved to and fro along the extension 38 (Figures 8 and 9) so that the cutting edge 77 scrapes the emulsion layer off the film. The relative overlapping positions of the film ends 50 and 51, with the emulsion layer 90 removed, is shown in Figure 11.

The right-hand clamping arms 21 and 23 are now swung upward and a layer of cement is applied to the upper surface of the exposed film end 50 from which the emulsion has been removed. The film end 51 is now brought down upon the cement coated film end 50 by swinging the clamp arms 21 and 23 downward until the lower spring detent 70 snaps over the screw 68. The excess cement oozes out of the junction into the groove formed by the bevel 49 (Figure 11) and is prevented from creeping back along the film by the tight engagement of the upper clamping cutters 36 and 45 with the film. The film ends 50 and 51 are held in their clamped overlapping positions until the cement has hardened. The upper arms 19 and 21 are then swung upwardly, permitting the spliced film to be removed from the instrument.

The co-action of the cams 90 and 91 as the clamp arm 19 is moved upward about 45 degrees permits the latter to shift axially under the urge of the coil spring 94. This causes the cutting edge 39 to move away from the cutting edge 48, leaving a space sufficient for the film end 51 to pass through while the clamp arms 21 and 23 are moved upward or downward past the cutter 39 when the same is in a raised position before commencing a downward or cutting stroke. Without the provision of this axial clearance of the cutters on the upstroke, it has been found that the film end crumples up and jams between the cutting edges 39 and 48.

While a specific embodiment of the invention has been described and illustrated, it will be understood that various modifications may be made within the scope of the appended claims without departing from the spirit of the invention.

What I claim is:

1. In a film splicer, a support, a lower clamping cutter fixed thereon and an upper clamping cutter movable toward and away therefrom, releasable cam means for moving and holding said upper clamping cutter into clamping engagement with a film end on said lower clamping cutter, said cam means comprising a link pivoted to the base for supporting a cam latch member adapted to engage and clamp said upper cutter to said base, a second pair of movable clamping cutters for another film end, means for moving said second pair of clamping cutters into shearing relationship with the first pair of clamping cutters to sever said film ends, and means for holding said second clamping cutters in clamping engagement one with the other, and means for releasably holding one of said second clamping cutters to the support; the upper cutting edges of the clamping cutters being horizontally offset relatively to the lower cutting edges thereof whereby to sever the film ends in overlapped relationship.

2. In a film splicer, a support, a lower clamping cutter fixed thereon and an upper clamping cutter movable toward and away therefrom, releasable cam means for moving and holding said upper clamping cutter into clamping engagement with a film end on said lower clamping cutter, said cam means comprising a lever pivotally attached to the support having a cam surface for interlockingly engaging the free end of said upper clamping member, a second pair of movable clamping cutters for another film end, means for moving said second pair of clamping cutters into shearing relationship with the first pair of clamping cutters to sever said film ends and to arrange said ends in overlapping relationship, and means for holding said second pair of clamping cutters in clamping engagement with one another and with said base, one of said lower clamping cutters having a recess adjacent its cutting edge for receiving excess cement from the overlapped film ends.

3. In a film splicer, a support, a lower clamping cutter fixed thereon and an upper clamping cutter movable toward and away therefrom, cam means for moving and holding said upper clamping cutter into clamping engagement with a film end on said lower clamping cutter, said cam means comprising a lever pivotally attached to the support having a cam surface for interlockingly engaging the free end of said upper clamping member, a second pair of movable clamping cutters hinged relative to one another and to said first mentioned clamping cutters for another film end, means for moving said second pair of clamping cutters into shearing relationship with the first pair of clamping cutters to sever said film ends, and means for holding said clamping cutters in clamping engagement with one another and in overlapping engagement with the first mentioned clamping cutters, one of said lower clamping cutters having a beveled portion adjacent its cutting edge whereby to provide a reservoir for the excess cement from the overlapped film ends.

4. In a film splicer, a support, a lower clamping cutter fixed thereon and an upper clamping cutter movable toward and away therefrom, cam means for moving said upper clamping cutter into clamping engagement with a film end on said lower clamping cutter, said cam means comprising a link pivoted to the base for supporting a cam latch member adapted to engage and clamp said upper cutter to said base, a second pair of movable clamping cutters for another film end, means for moving said second pair of clamping cutters into shearing relationship with the first pair of clamping cutters to sever said film ends in overlapping relationship, releasable spring means for holding one of said upper clamping cutters into clamping engagement with a film end on the lower clamping cutter associated therewith and releasable spring means for clamping said lower cooperating clamping cutter to the support.

5. In a film splicer, a support, a lower clamping cutter fixed thereon and an upper clamping cutter movable toward and away therefrom, means for moving said upper clamping cutter into clamping engagement with a film end on said lower clamping cutter, a second pair of movable clamping cutters for another film end, means for moving said second pair of clamping cutters into shearing relationship with the first pair of clamping cutters to sever said film ends in overlapping relationship, cam means for urging one of said upper clamping cutters into clamping engagement with a film end on the lower clamping cutter associated therewith, and adjustable stop means associated with said cam means for limiting the clamping action thereof.

6. In a film splicer, a support, a lower clamping cutter fixed thereon and an upper clamping cutter, means for releasably holding and moving said upper clamping cutter into clamping engagement with a film end on said lower clamping cutter, said means comprising a cam latch member pivoted to the base and engaging the upper clamping cutter, a second pair of movable clamping cutters for another film end, said first and second clamping cutters being offset with respect to one another, means for moving said second pair of clamping cutters into shearing relationship with the first pair of clamping cutters to sever said film ends, releasable means for holding said movable upper and lower clamping cutters in clamping engagement with one another during their motion and means for releasably holding the lowermost of said second clamping cutters to said support.

7. In a film splicer, a support, a lower clamping cutter fixed thereon and an upper clamping cutter, means for releasably holding and moving said upper clamping cutter into clamping engagement with a film end on said lower clamping cutter, said means comprising a rotatable cam member pivotally carried by the base and engaging the free end of said swinging clamping cutter, a second pair of movable clamping cutters for another film end, means for moving said second pair of clamping cutters into shearing relationship with the first pair of clamping cutters to sever said film ends, releasable detent means for holding said movable upper and lower clamping cutters in clamping engagement with one another during their motion and releasable clamping means for anchoring the lowermost of said second pair of movable clamping cutters to said support.

8. In a film splicer, a support, a lower clamping cutter thereon and an upper clamping cutter, cam means for holding and moving said upper clamping cutter into clamping engagement with a film end on said lower clamping cutter, said cam means comprising a pivoted latch lever having a cam surface adapted to clampingly and lockingly engage the free end of said upper clamping cutter, a second pair of movable clamping cutters for another film end, means for moving said second pair of clamping cutters into shearing relationship with the first pair of clamping cutters to sever said film ends, means for holding said movable upper and lower clamping cutters in clamping engagement with one another during their motion, and additional means for releasably holding said movable lower clamping cutter in engagement with said support.

9. In a film splicer, a support, a lower clamping cutter thereon and an upper clamping cutter, means for releasably holding and moving said upper clamping cutter into clamping engagement with a film end on said lower clamping cutter, said releasable means comprising a latch member pivoted to the support having a cam surface for interlockingly engaging the free end of said upper clamping cutter, a second pair of movable clamping cutters for another film end, means for moving said second pair of clamping cutters into shearing relationship with the first pair of clamping cutters to sever said film ends, and means for releasably holding said clamping cutters in clamping engagement with one another and to said base, one of said clamping cutters having a scraper guide portion extended transversely of the film.

10. In a film splicer, a support, a fixed lower clamping cutter thereon, a swinging arm, an upper clamping cutter thereon movable into engagement with said fixed lower clamping cutter, releasable cam means for holding said arm and upper clamping member to the base, said releasable cam means comprising a pivoted latch member having a cam surface for interlockingly engaging the free swinging end of said swinging arm, associated upper and lower swinging arms, upper and lower clamping cutters respectively thereon, said clamping cutters on said associated arms being movable into shearing relationship with the previously mentioned clamping cutters, and releasable means for holding said associated swinging arms together during their swinging motion.

11. In a film splicer, a support, a fixed lower clamping cutter thereon, a swinging arm, releasable cam means for holding said swinging arm to said base an upper clamping cutter thereon movable into engagement with said fixed lower clamping cutter, associated upper and lower swinging arms, upper and lower clamping cutters respectively thereon, said clamping cutters on said associated arms being movable into shearing relationship with the previously mentioned clamping cutters, and releasable means for holding said associated swinging arms together during their swinging motion, the upper cutting edges of the clamping cutters being horizontally offset relatively to the lower cutting edges thereof whereby to sever the film ends in overlapped relationship, and a latch member carried by the lower associated swinging arm engageable with an adjustable projection carried by the base.

12. In a film splicer, a support, a fixed lower clamping cutter thereon, a swinging arm, an upper clamping cutter thereon movable into engagement with said fixed lower clamping cutter, associated upper and lower swinging arms, upper and lower clamping cutters respectively thereon, said clamping cutters on said associated arms being movable into shearing relationship with the previously mentioned clamping cutters, releasable means for holding said associated swinging arms together during their swinging motion, and additional releasable means carried by the lower of said associated swinging arms in releasable engagement with said support.

13. In a film splicer, a support, a fixed lower clamping cutter thereon, a swinging arm, an upper clamping cutter thereon movable into engagement with said fixed lower clamping cutter, associated upper and lower swinging arms, upper and lower clamping cutters respectively thereon, said clamping cutters on said associated arms being movable into shearing relationship with the previously mentioned clamping cutters, releasable means for holding said associated swinging arms together during their swinging motion, and cam means for urging said first-mentioned upper swinging arm into clamping engagement with said support said cam means comprising a pivoted latch member hingedly connected to the support with a cam surface interlockingly engaging the free end of said upper swinging arm.

14. In a film splicer, a support, a fixed lower clamping cutter thereon, a swinging arm, an upper clamping cutter thereon movable into engagement with said fixed lower clamping cutter, associated upper and lower swinging arms, upper and lower clamping cutters respectively thereon, said clamping cutters on said associated arms being movable into shearing relationship with the previously mentioned clamping cutters, and means for moving one of said clamping cutters axially whereby to provide clearance for the film end on the upstroke.

15. In a film splicer, a support, a fixed lower clamping cutter thereon, a swinging arm, an upper clamping cutter thereon movable into engagement with said fixed lower clamping cutter, associated upper and lower swinging arms, upper and lower clamping cutters respectively thereon, said clamping cutters on said associated arms being movable into shearing relationship with the previously mentioned clamping cutters, and cam mechanism for moving one of said clamping cutters axially whereby to provide clearance for the film end on the upstroke.

ROBERT MATSON.